US012496789B2

(12) United States Patent
Tsai et al.

(10) Patent No.: US 12,496,789 B2
(45) Date of Patent: Dec. 16, 2025

(54) METHOD OF PREPARING EYE-TRACKING GLASSES (71) Applicants: Asphetek Solution (Chengdu) Ltd., Chengdu (CN); Asphetek Solution Inc., Hsinchu (TW); ADVANCED OPTOELECTRONIC TECHNOLOGY, INC., Hsinchu County (TW)

(72) Inventors: Ying-Hung Tsai, Hsinchu (TW); Chung-Wu Liu, Hsinchu (TW); I-Ming Cheng, Hsinchu (TW); Yi-Huan Chou, Hsinchu (TW)

(73) Assignees: Asphetek Solution (Chengdu) Ltd., Chengdu (CN); Asphetek Solution Inc., Hsinchu (TW); ADVANCED OPTOELECTRONIC TECHNOLOGY, INC., Hsinchu County (TW)

(*) Notice: Subject to any disclaimer, the term of this patent is extended or adjusted under 35 U.S.C. 154(b) by 336 days.

(21) Appl. No.: 18/242,151

(22) Filed: Sep. 5, 2023

(65) Prior Publication Data
US 2025/0018665 A1     Jan. 16, 2025

(30) Foreign Application Priority Data
Jul. 13, 2023  (CN) .......................... 202310861539.5

(51) Int. Cl.
*B29D 11/00* (2006.01)
*B29K 79/00* (2006.01)
*B29K 709/08* (2006.01)

(52) U.S. Cl.
CPC .... *B29D 11/00009* (2013.01); *B29D 11/0073* (2013.01); *B29D 11/00807* (2013.01); *B29K 2079/08* (2013.01); *B29K 2709/08* (2013.01)

(58) Field of Classification Search
None
See application file for complete search history.

(56) References Cited

U.S. PATENT DOCUMENTS

2018/0031839 A1* 2/2018 Schuster .............. G02B 6/0035

FOREIGN PATENT DOCUMENTS

| CN | 109884736 A | 6/2019 |
| CN | 213544987 U | 6/2021 |

* cited by examiner

*Primary Examiner* — Barbara J Musser
(74) *Attorney, Agent, or Firm* — ScienBiziP, P.C.

(57) ABSTRACT

A method for preparing eye-tracking glasses: providing a substrate assembly, the substrate assembly comprising a functional film, the functional film being located on an outermost surface of the substrate assembly as a first surface, the first surface is provided with electronic components. Spraying a matching material towards the first surface, the matching material accumulating at least at a gap difference between the first surface and the electronic component. Providing a sealing layer, the sealing layer covering the first surface and the electronic components and the matching material disposed on the first surface. Providing a lens, the lens being connected to the functional film and the electronic components by the sealing layer.

19 Claims, 9 Drawing Sheets

METHOD OF PREPARING EYE-TRACKING GLASSES

FIELD

The subject matter relates to the technical field of headsets, and in particular, to a method of preparing eye-tracking glasses.

BACKGROUND

Eye-tracking technology is a kind of technology that utilizes mechanical, electronic, optical and other detection means to obtain the user's current "gaze direction". With the rapid development of computer vision, artificial intelligence technology and digitization technology, eye-tracking technology has become a hot research field, and has a wide range of applications in the field of human-computer interaction, for example, it can be applied to virtual reality, augmented reality, vehicle assisted driving, user experience, cognitive impairment diagnosis and other fields. When eye-tracking technology is realized in headsets such as virtual reality devices and augmented reality devices, it is usually necessary to set up light sources and camera devices in headsets. In order to ensure the effect of user experience and avoid blocking the user's vision, it is necessary to set the light source in a suitable position.

Eye-tracking techniques can generally be classified into methods such as pupillary corneal reflection method, retinal imaging, calculating the center of vision after modeling the eye, retinal reflected light intensity, and reflected light intensity of the cornea. In the above classification of eye-tracking techniques, the first pupillary corneal reflection method, the second retinal image, and the third calculation of the visual center after modeling the eye, all three of which require the use of a camera. Among them, the first pupil corneal reflection method and the second retinal image are obtained by processing the image of the eye and extracting the feature points through a calculator, and then the visual center of the eye is obtained. The third one calculates the visual center after modeling the eye requires a camera (infrared camera, depth camera) to reconstruct the eye into a 3D model before calculating the visual center. The fourth type of retinal reflected light intensity and the fifth type of corneal reflected light intensity can only be used to obtain the visual center of the eye by capturing the intensity of the reflected light from the eye by one or several photosensitive sensor components, which may come from the center of the cornea or the retina. Obviously, realizing eye-tracking with the help of photosensitive sensors has certain advantages.

However, in the prior art, the process step of setting the photosensitive sensor in the lens is mainly as follows: the substrate provided with the photosensitive sensor is first encapsulated, and after the encapsulation is completed, a solid optical adhesive is laminated, and the photosensitive sensor is adhered to the surface of the lens through the solid optical adhesive. However, this is a very long process, requiring multiple coating, drying, shaping and other processes, and it is difficult to control the uniformity of each layer, which is more likely to generate air bubbles and cause unstable yields of the final product. How to produce eyeglasses with photosensitive sensors that can realize eye-tracking technology through a stable and efficient process is a consideration for those skilled in the art.

DETAILED DESCRIPTION

The following descriptions refer to the attached drawings for a more comprehensive description of this application. Sample embodiments of this application are shown in the attached drawings. However, this application can be implemented in many different forms and should not be construed as limited to exemplary embodiments set forth herein. These exemplary embodiments are provided to make this application thorough and complete, and to adequately communicate the scope of this application to those skilled in the field. Similar view labels represent the same or similar components.

The terms used herein are intended only to describe the purpose of particular exemplary embodiments and are not intended to limit this application. As used herein, the singular forms "one" and "the" are intended to include the plural as well, unless the context otherwise clearly indicates it. In addition, when used herein, the words "include" and/or "have", integers, steps, operations and/or components, do not exclude additional or pluralities of features, regions, integers, steps, operations, components, and/or groups thereof.

Unless otherwise defined, all terms used herein (including technical and scientific terms) have the same meaning as would normally be understood by ordinary technicians in the field of this application. In addition, unless expressly defined in the context, terms such as those defined in a general dictionary shall be construed to have meanings consistent with those in the relevant technology and in the content of this application, and shall not be construed to have idealistic or overly formal meanings.

Examples of embodiments are described below in combination with the attached drawings. It should be noted that the components depicted in the attached drawings may be shown not to scale; the same or similar components will be assigned the same or similar drawing mark representation or similar technical terms.

Usually, eye-tracking techniques can be generally classified into methods such as pupillary corneal reflection method, retinal imaging, calculating the center of vision after modeling the eye, retinal reflected light intensity, and reflected light intensity of the cornea. In the above classification of eye-tracking techniques, the first pupil corneal reflection method, the second retinal image, and the third calculation of the visual center after modeling the eye, all three of which require the use of a camera. Among them, the first pupil corneal reflection method and the second retinal image are obtained by processing the image of the eye and extracting the feature points through a calculator, and then the visual center of the eye is obtained. The third one calculates the visual center after modeling the eye requires a camera (infrared camera, depth camera) to reconstruct the eye into a 3D model before calculating the visual center. The fourth retinal reflected light intensity and the fifth corneal reflected light intensity can be used to obtain the visual center of the eye simply by capturing the intensity of the reflected light from the eye by one or several photosensitive sensor assemblies, which may come from the center of the cornea or from the retina.

Obviously, realizing eye-tracking with the help of a photosensitive sensor has certain advantages. However, in the existing technology, the process steps of setting the photosensitive sensor in the lens are mainly as follows: the substrate equipped with the photosensitive sensor is first encapsulated, and after the encapsulation is completed, the solid optical adhesive is then laminated, so that the photosensitive sensor is adhered to the surface of the lens through the solid optical adhesive. However, this way of process is very long, need to go through a number of coating, drying, shaping and other processes, and it is difficult to control the uniformity of each layer, more likely to produce air bubbles and cause the yield of the final product is not stable. Especially at the gap between the electronic component and the base film that carries the electronic component, it is easier to produce air bubbles, which negatively affects the yield.

Correspondingly, the present application provides a method of preparing eye-tracking glasses, comprising the steps of: providing a substrate assembly, the substrate assembly comprising a functional film, the functional film being disposed on an outermost surface of the substrate assembly as a first surface, the first surface being provided with an electronic component in a protruding position; spraying a matching material by means of spraying towards the first surface, the matching material being piled up at least at a gap where the first surface is connected with the electronic components; providing a sealing layer such that the sealing layer covers the first surface and the electronic components and the matching material provided on the first surface; and providing a lens such that the lens is connected to the functional film and the electronic components through the sealing layer.

Therefore, in the preparation method of the eye-tracking glasses provided in the present application, the spraying process is used to make the matching material fill the gap between the first surface and the electronic components, which on the one hand can reduce the gap between the electronic components and the first surface, and on the other hand can fill the turning point of the connection between the electronic components and the functional film, reduce the possibility of generating bubbles in the process of attaching a sealing layer in the subsequent process, and improve the yield of the eye-tracking glasses in the preparation process. The yield of the preparation process of the eyeglasses is improved.

As understood by those skilled in the art, "electronic components" refers to electronic components and parts of small machines and instruments, which themselves often consist of a number of parts and can be commonly used in products of the same type.

As may be understood by persons skilled in the art, "vertical cavity surface emitting laser" refers to a semiconductor in which laser light is emitted perpendicularly to the top surface, abbreviated as VCSEL.

As may be understood by a person skilled in the art, "infrared light emitting diode" refers to a diode that emits infrared light, also known as an IR LED.

As may be understood by a person skilled in the art, "polyimide" refers to a class of polymers containing an imide ring (—CO—NR—CO—) in the main chain, which has good optical properties, abbreviated as PI.

As understood by those skilled in the art, "optical adhesive" refers to materials with good light transmission, such as OCA (Optically Clear Adhesive) or OCR (Optical Clear Resin), of which OCR is in liquid form and is also known as Liquid Optical Adhesive (LOCA), Optical Clear Adhesive or LOCA, OCR is colorless and transparent after curing, with a light transmission rate of 98% or more, with a small curing shrinkage, resistance to yellowing and other characteristics.

As understood by those skilled in the art, the "sealing layer" may be a DAF (Die Attach Film), which is an ultra-thin film adhesive used to connect a semiconductor chip to a package substrate and a chip to a chip in a semiconductor packaging process, and which may also be used in other fields to realize the layering and thinning of packages. It can also be used in other fields.

Specific embodiments of the present application are described in further detail below with reference to the accompanying drawings.

Figure 1:
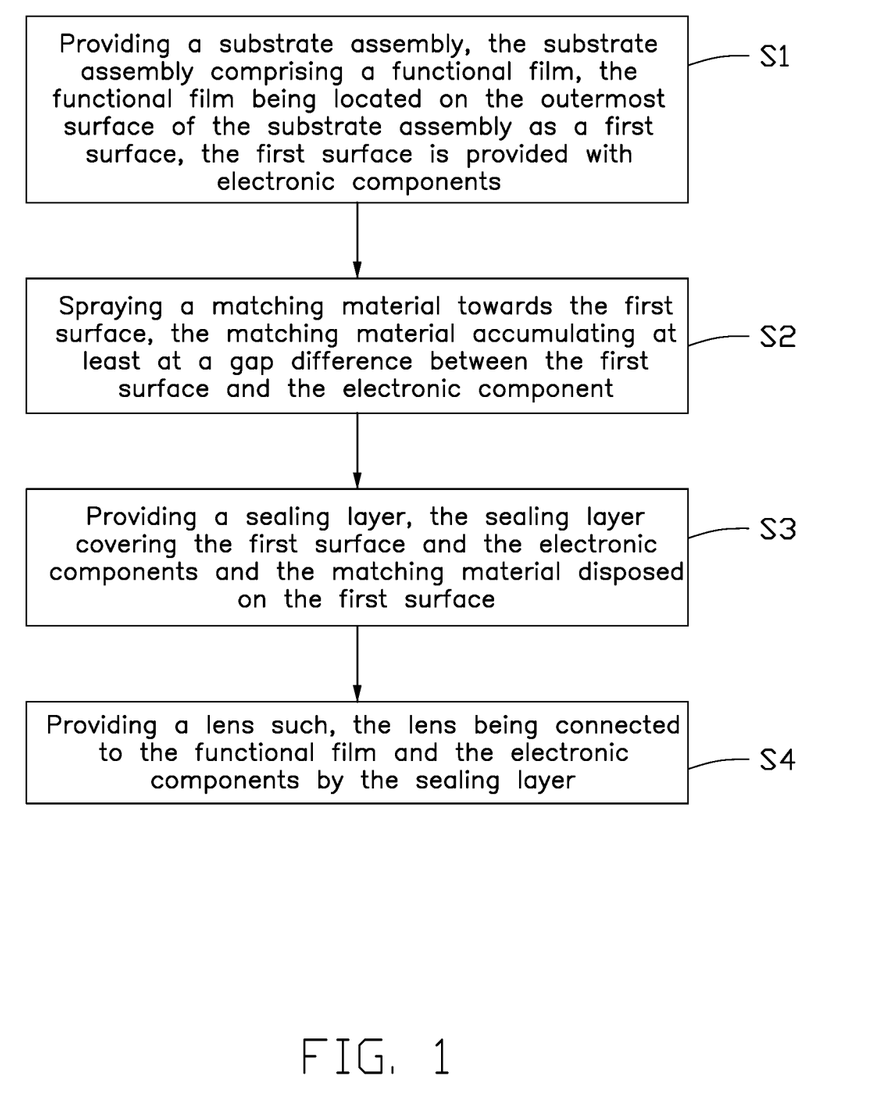
FIG. 1 is a schematic view of the process of preparation method of eye-tracking glasses of the present application.
Figure 2:
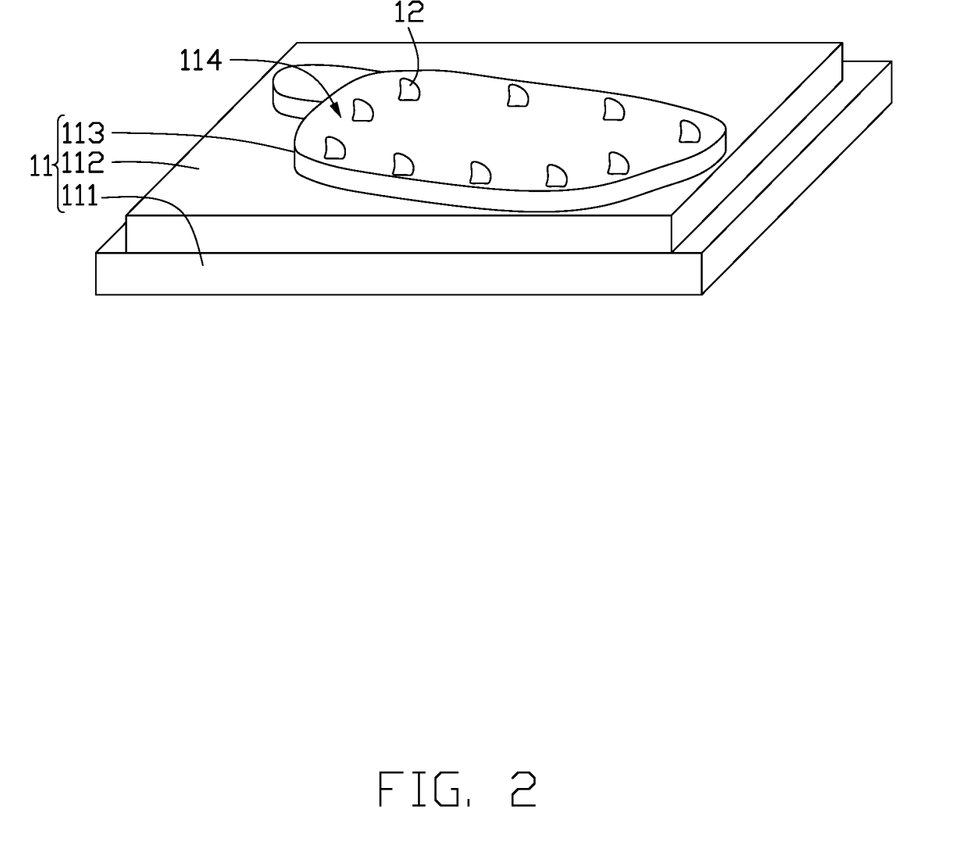
FIG. 2 is a schematic view of a partial process structure of the preparation method of eye-tracking glasses of the present application.
Figure 7:
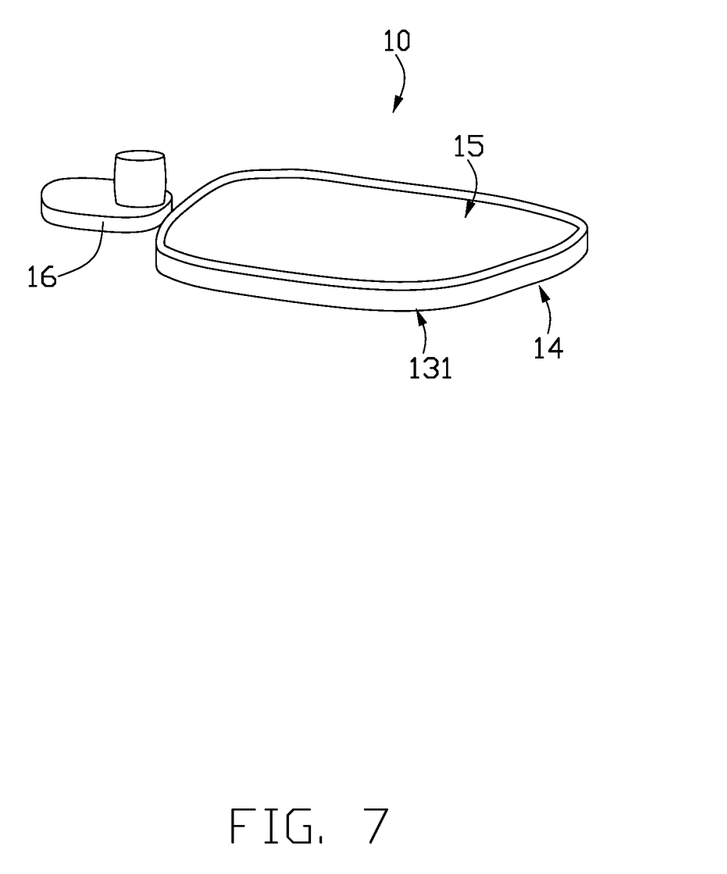
FIG. 7 is a schematic view of a partial process structure of the preparation method of eye-tracking glasses of the present application.

Embodiments of the present application provide a method of preparing eye-tracking glasses 10, as shown in FIG. 1, the method of preparing eye-tracking glasses 10 includes the following steps:

Step S1: As shown in FIGS. 2 and 7, a substrate assembly 11 is provided, the substrate assembly 11 includes a functional film 113, the surface of the functional film 113 disposed at the outermost side of the substrate assembly 11 is a first surface 114, and the first surface 114 is provided with electronic components 12 in a raised position.

In an embodiment, predetermination of the position of the electronic components 12 is realized by laying the electronic components 12 on the first surface 114. It can be understood that the functional film 113 can be used as a carrier for the electronic components 12. Fixing mutual electronic components 12 to the first surface 114 can determine the mutual positional relationship between the mutual electronic components 12. The alignment for realizing the connection of the electronic components 12 to each other or to external circuits (e.g., flexible circuit boards 16) can also be set on the first surface 114, and the alignment can be laid in advance by the carrier of the functional film 113. The alignment can also be provided on the first surface 114, and the alignment can be laid out in advance by means of a functional film 113.

As can be understood, the general electronic component 12 may be cubic, granular, columnar and other shapes, and regardless of what kind of regular or irregular shape the electronic component 12 has, it often has a certain thickness, which is about 60 μm to 180 μm. So the electronic component 12 disposed on the first surface 114 raised in comparison with the first surface 114. There is a gap between the raised electronic component 12 and the first surface 114 during subsequent processing. There is a gap between the raised electronic component 12 and the first surface 114, and in the subsequent processing, the gas located at the gap 17 is not easily discharged, which in turn is prone to generate bubbles inside the film layer and cause product defects. Therefore, it is necessary to use the matching material 131 to fill the gap 17 in the subsequent step S2 to solve this problem.

In this embodiment, the electronic component 12 includes at least one of a vertical cavity surface emitting laser and an infrared light emitting diode.

The vertical cavity surface emitting laser and the infrared light emitting diode can be applied to the eye-tracking glasses 10. The vertical cavity surface emitting laser and the infrared light emitting diode are provided in the peripheral region of the eye-tracking glasses 10. The alignment connecting the vertical cavity surface emitting laser and the infrared light emitting diode is led outwardly to the rim of the eye-tracking glasses 10, and the tracking of the wearer's eyes can be realized.

In an embodiment, the electronic component 12 may also include a component (not shown) with a signal relay function connected to the vertical cavity surface emitting laser and the infrared light emitting diode for electrical connection of the lens 15 to the external circuitry.

In this embodiment, the substrate assembly 11 further includes a carrier plate 111 and a matching film 112. The matching film 112 is disposed on a surface of the carrier plate 111. The functional film 113 is disposed on a surface of the matching film 112 away from the carrier plate 111. The first surface 114 is a surface of the functional film 113 away from the matching film 112. The functional film 113 is in separable contact with the matching film 112. The electronic component 12 is disposed on a side of the functional film 113 away from the matching film 112. The material of the functional film 113 includes polyimide (PI).

Understandably, the functional film 113 will be adhered to the surface of the lens 15 after the subsequent process. So the functional film 113 should be selected as a material with a better optical effect (e.g., polyimide, PI). And similarly, in order to minimize the effect of the functional film 113 on the optical properties of the lens 15, the functional film 113 is preferably a thinner film-like material. However, the thinner film-like material may have poorer support properties of its own, which may make the processing process more difficult or negatively affect the overall processing efficiency. Therefore, it is necessary to introduce a rigid carrier plate 111, which may be selected as a glass material. The functional film 113 is carried on the rigid carrier plate 111, which facilitates other subsequent processing as well as the deployment of the electronic components 12. There may be problems with the adhesion between the carrier plate 111 made of glass and the functional film 113 made of polyimide, for example, the functional film 113 shrinks on the surface of the carrier plate 111 under the influence of temperature changes to produce wrinkles. Therefore, there is a need to further introduce a matching film 112 between the carrier plate 111 and the functional film 113, so that the functional film 113 can be better adhered to the surface of the carrier plate 111 and is less prone to deformation. And, the selection of the matching film 112 mainly considers the adhesion effect between the carrier plate 111 and the functional film 113, and its optical properties may be difficult to meet the needs of the lens 15. So it is necessary to set the matching film 112 in detachable contact with the function, so that on the one hand, the matching film 112 itself can be detached from the functional film 113, and on the other hand, it is convenient for the separation of the functional film 113 and the carrier plate 111.

Step S2: As shown in FIG. 3 and FIGS. 7 to 9, a matching material 131 is sprayed toward the first surface 114, the matching material 131 accumulating at least at a gap 17 where the first surface 114 is connected to the electronic component 12.

Figure 3:
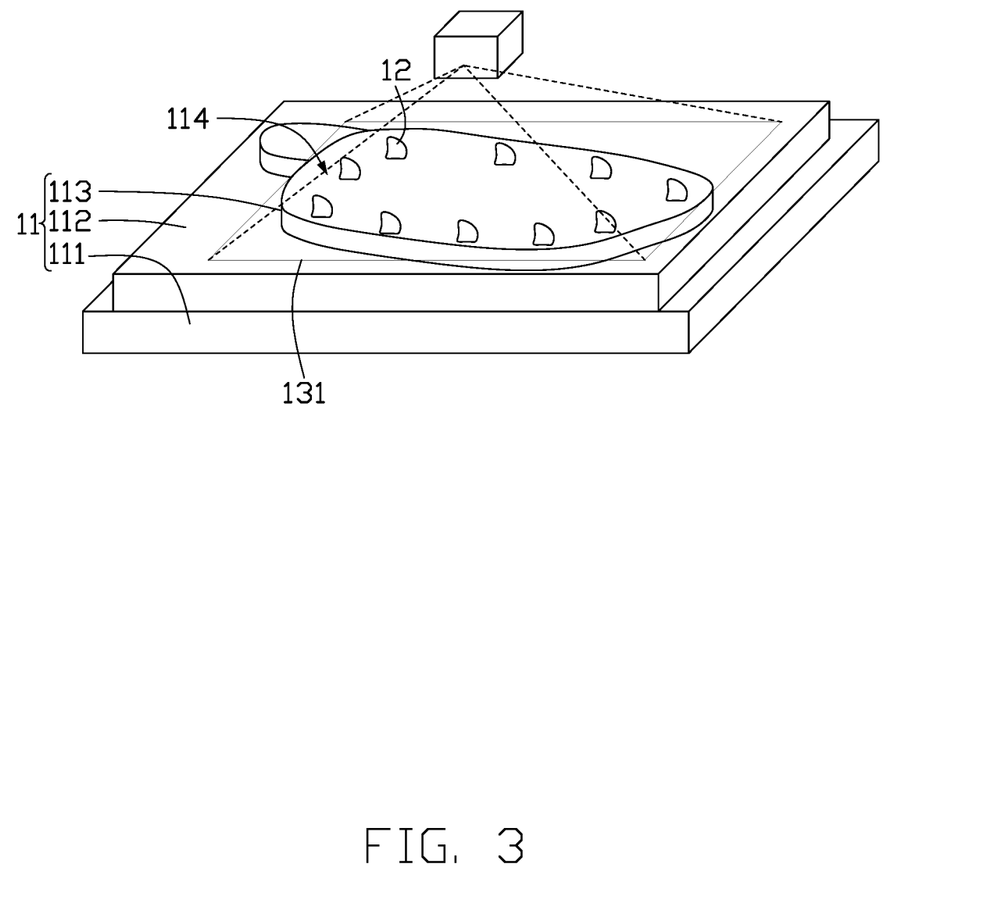
FIG. 3 is a schematic view of a partial process structure of the preparation method of eye-tracking glasses of the present application.
Figure 4:
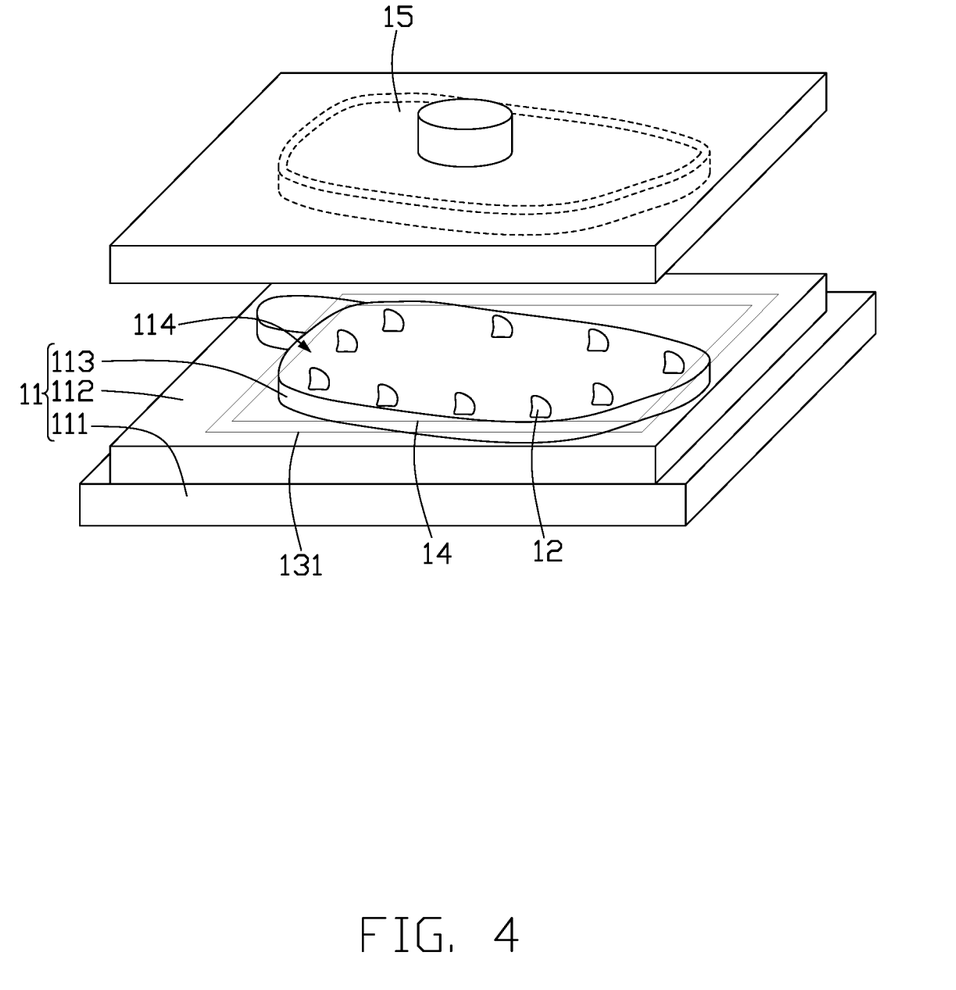
FIG. 4 is a schematic view of a partial process structure of the preparation method of eye-tracking glasses of the present application.

There exists a gap 17 between the electronic component 12 and the first surface 114. In order to solve the air bubble problem as previously described, it is necessary to direct the granular matching material 131 to the gap 17 by means of spraying and continuously spraying so that the matching material 131 accumulates in the gap 17 to reach a predetermined thickness, thereby realizing the reduction of the height of the gap between the outer surface of the electronic component 12 and the first surface 114. The height of the gap between the outer surface of the electronic component 12 and the first surface 114 is reduced. For different electronic components 12 and their corresponding different heights of the gaps 17, specific parameters of the spraying process can be adjusted to achieve a suitable buildup effect.

In one embodiment, in the process of spraying the matching material 131 towards the first surface 114 by means of spraying, a mask (not shown) is provided to allow the matching material 131 to be sprayed on the first surface 114 through the mask.

The mask may include a solid part (not shown) and an opening part (not shown) that opened on the solid part. The solid part is used to block the matching material 131 from passing through, avoiding the matching material 131 from being set in a non-designated area. The opening part is used to allow the matching material 131 to pass through, ensuring that the matching material 131 can be stacked more accurately at the gap 17 or other pre-determined positions. Thereby ensuring that the stacking of the matching material 131 is effective while avoiding negatively affecting the overall optical performance of the eye-tracking glasses 10. effect while avoiding negatively affecting the overall optical performance of the eye-tracking glasses 10.

Figure 8:
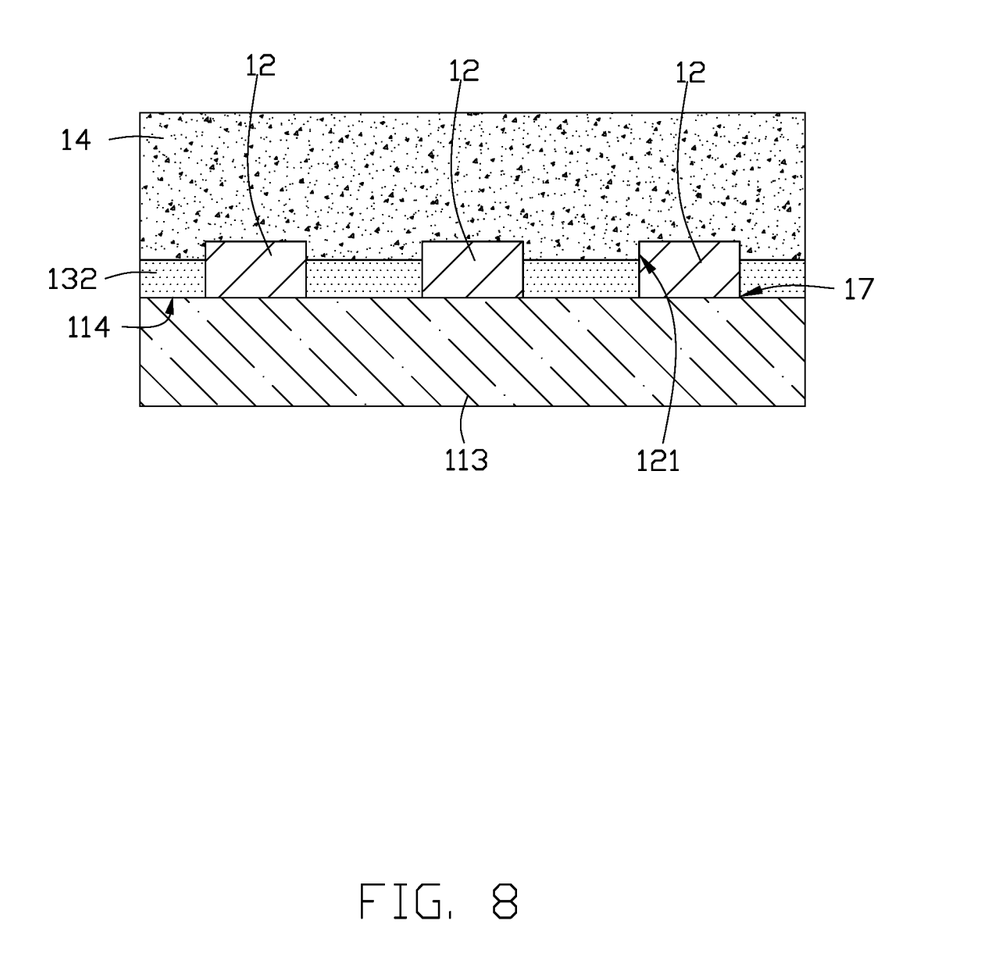
FIG. 8 is a schematic view of a structure of a functional film, an electronic component, a matching layer, and a sealing layer of eye-tracking glasses of the present application.

As shown in FIG. 8, the matching material 131 is disposed on the first surface 114 to form a matching layer 132. The side 121 of the electronic component 12 is wrapped by the matching layer 132. At least a portion of the end portion of the electronic component 12 that is away from the first surface 114 is exposed through the matching layer 132.

In this embodiment, the thickness of the matching layer 132 is less than the height of the electronic component 12 relative to the height of the projection of the first surface 114.

The matching layer 132 may be provided with a continuous flat layer structure. The continuous matching layer 132 may be formed through a relatively uniform spraying process. on the one hand, the continuous matching layer 132 may reduce the difficulty of molding the matching layer 132. On the other hand, in the subsequent step, the continuous sealing layer 14 is connected to the functional film 113 through the continuous matching layer 132. The matching layer 132, and the functional film 113 constitute a composite optical film layer with a small difference in structure and thickness at various places, which can improve its overall optical uniformity.

Figure 9:
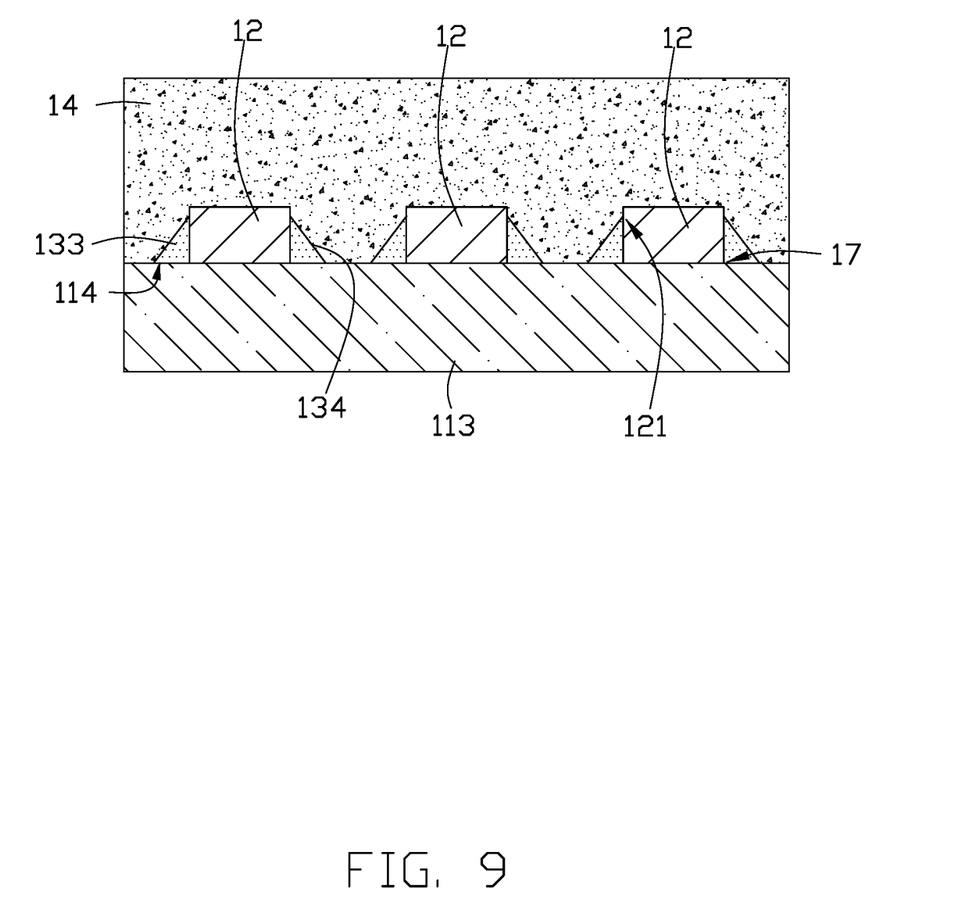
FIG. 9 is a schematic view of a structure of a functional film, an electronic component, a matching portion and a sealing layer of eye-tracking glasses of the present application.

As shown in FIG. 9, in one embodiment, the matching material 131 surrounds the electronic component 12 to form a matching portion 133. The matching portion 133 is mainly provided at the gap between the electronic component 12 and the first surface 114. The matching portion 133 includes an inclined connecting surface 134 located at an outermost side thereof. The inclined connecting surface 134 incline to connect a region comprising a side 121 and a first surface 114 of the electronic component 12. The other portions of the matching portion 133 fill the area formed by the inclined connecting surface 134, the side 121, and the first surface 114. The direct gap between the electronic component 12 and the first surface 114 is minimized.

Forming the matching portion 133 by direct stacking against the gap 17 and having the inclined connecting surface 134 constructed as an inclined connection between the side 121 and the first surface 114 of the electronic component 12, the gap can be eliminated to a certain extent. Narrowing the setting area of the matching material 131 so that the matching material 131 exists in the form of the matching portion 133 can eliminate the gap while also avoiding the matching material 131 from covering more other areas of the functional film 113. This in turn avoids negatively affecting the overall optical performance of the eye-tracking glasses 10 due to the setting of multiple layers of materials with different refractive indexes.

In one embodiment, the height of the matching material 131 stacked on the first surface 114 is less than 30 μm.

The matching material 131 is formed by spraying, and the spraying method is generally not efficient enough for molding compared to the direct film application method. Controlling the height of the matching material 131 to be less than 30 μm, while avoiding air bubbles at the gap 17 as much as possible, can also make the preparation process of the eye-tracking spectacles 10 to maintain a high efficiency.

Step S3: AS shown in FIGS. 4 to 7, the sealing layer 14 is provided such that the sealing layer 14 covers the first surface 114 and the electronic component 12 and the matching material 131 disposed on the first surface 114.

The sealing layer 14 may be a DAF (Die Attach Film).

In one embodiment, the matching material 131 or the sealing layer 14 comprises an optical adhesive or an optical water adhesive, which may specifically be OCA (Optically Clear Adhesive) or OCR (Optical Clear Resin).

In one embodiment, the matching material 131 or the sealing layer 14 has a refractive index greater than or equal to 1.

In one embodiment, the refractive index of the matching material 131 or the sealing layer 14 ranges from 1.48 to 1.53.

It will be appreciated that controlling the refractive index of the matching material 131 or the sealing layer 14 to be greater than or equal to 1, preferably from 1.48 to 1.53, may result in better optical performance of the eye-tracking glass 10 as a whole. The refractive index of the control matching material 131 or the sealing layer 14 may specifically be 1.49, 1.50, 1.51 or 1.52.

The refractive indices of the matching material 131 and the sealing layer 14 should be the same as far as possible. Preferably, the matching material 131 and the sealing layer 14 have the same refractive index. More preferably, the refractive indices of the matching material 131, the sealing layer 14, and the functional film 113 are all the same.

Step S4: As shown in FIGS. 4 to 7, the lens 15 is provided such that the lens 15 is connected to the functional film 113 and the electronic component 12 via the sealing layer 14.

Figure 5:
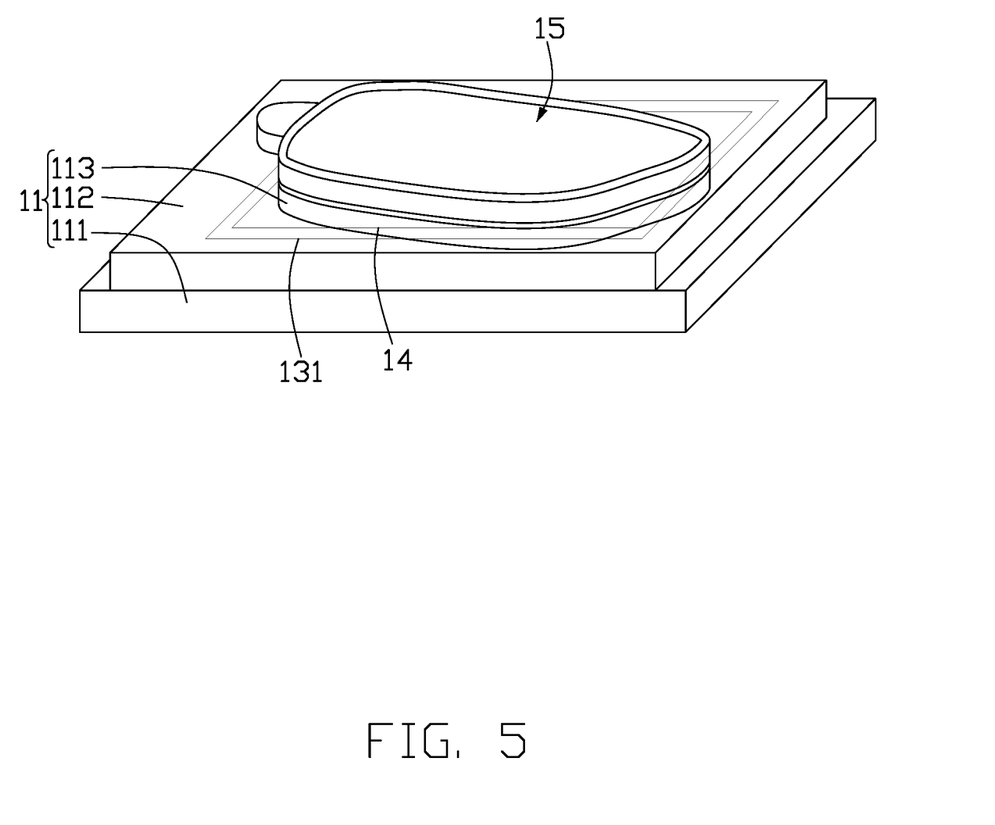
FIG. 5 is a schematic view of a partial process structure of the preparation method of eye-tracking glasses of the present application.

In one embodiment, as shown in FIG. 5, a lens 15 is provided, and the lens 15 is pressed and fitted to a surface of the sealing layer 14. Once the press-fit process is in place, the sealing layer 14 is cured using, for example, heat or light curing to realize the connection of the lens 15 to the functional film 113 and the electronic component 12.

Figure 6:
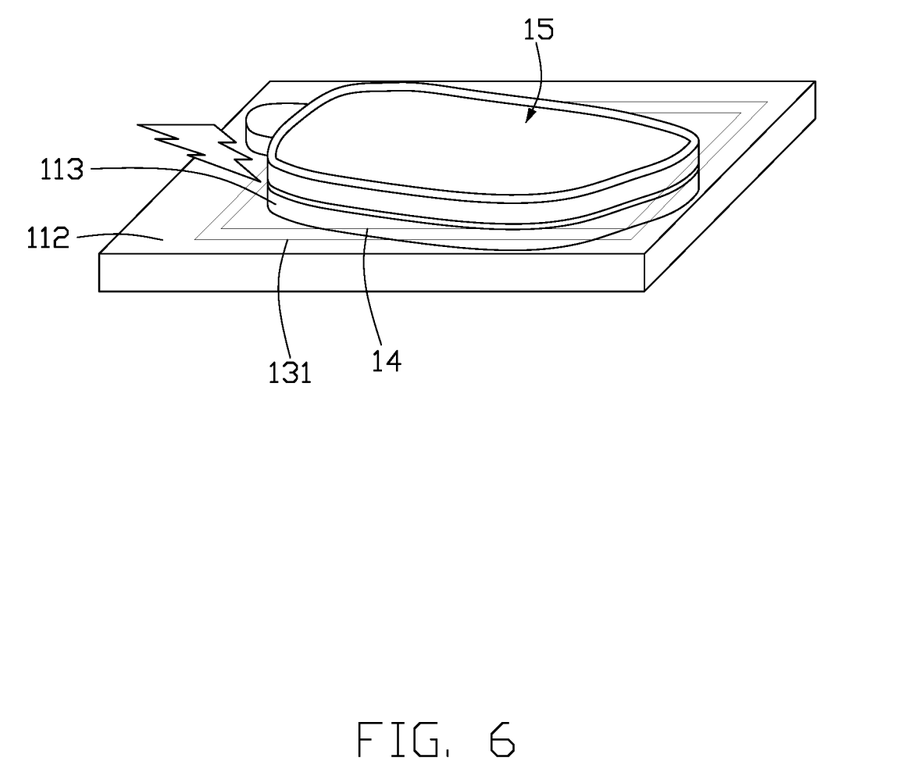
FIG. 6 is a schematic view of a partial process structure of the preparation method of eye-tracking glasses of the present application.

In an embodiment, as shown in FIG. 6, the excess of the functional film 113 and the sealing layer 14 beyond the edge of the lens 15 is removed and shaped.

During the process of setting the functional film 113, the matching material 131, and the sealing layer 14, the size of the functional film 113, the matching material 131, and the sealing layer 14 may be set to be larger than that of the carrier plate 111 or the lens 15, and that the excess portion needs to be shaped after the attachment is completed.

In an embodiment, as shown in FIG. 7, the electronic component 12 is electrically connected to the external circuit board 16 and the perimeter of the lens 15 is sealed.

After realizing the connection between the circuit board 16 and the electronic components 12, the circuit can further be tested through the connected lines to ensure that the product can be properly energized and operated.

In the method of preparing eye-tracking glasses, the spraying process is used to make the matching material 131 fill the gap 17 where the first surface 114 is connected to the electronic component 12. On the one hand, it can reduce the gap between the electronic component 12 and the first surface 114. On the other hand, it can fill the turning point where the electronic component is connected to the functional film 113, and reduce the possibility of air bubbles generated during the process of subsequently attaching the sealing layer 14, reducing the possibility of generating air bubbles during the process, and improving the yield rate of the preparation process of the eye-tracking glasses 10.

It is to be understood that the contents shown in FIGS. 2 to 9 of this application are used to help show the relative positional relationship of the elements, and do not limit the size, thickness, proportion, etc., of the elements, and the proportion of the thickness or size of the elements between the elements shown in the drawings may be varied within the feasible range according to the actual situation.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure.

What is claimed is:

1. A method of preparing eye-tracking glasses, comprising:
   providing a substrate assembly, the substrate assembly comprising a functional film, the functional film being located on an outermost surface of the substrate assembly as a first surface, the first surface is provided with electronic components;
   spraying a matching material towards the first surface, the matching material accumulating at least at a gap difference between the first surface and the electronic components;
   providing a sealing layer, the sealing layer covering the first surface and the electronic components and the matching material disposed on the first surface; and
   providing a lens, the lens being connected to the functional film and the electronic components by the sealing layer.

2. The method of preparing eye-tracking glasses of claim 1, wherein the matching material is disposed on the first surface to form a matching layer, and the sides of the electronic components are wrapped by the matching layer.

3. The method of preparing eye-tracking glasses of claim 2, wherein at least a portion of an ends of the electronic components away from the first surface are exposed through the matching layer.

4. The method of preparing eye-tracking glasses of claim 2, wherein a thickness of the matching layer is less than a height of the electronic components raised in relation to the first surface.

5. The method of preparing eye-tracking glasses of claim 2, wherein the matching layer is provided with a continuous flat layer structure, and the continuous matching layer is formed through a relatively uniform spraying process.

6. The method of preparing eye-tracking glass of claim 1, wherein the matching material surrounds the electronic component to form a matching portion, and the matching portion fills the gap difference between the electronic components and the first surface.

7. The method of preparing eye-tracking glass of claim 6, wherein the matching portion comprises an inclined connecting surface, and the inclined connecting surface constructed to incline to connect a side of each of the electronic component to the first surface.

8. The method of preparing eye-tracking glass of claim 7, wherein the matching portion fills an area formed by the inclined connecting surface, the side and the first surface.

9. The method of preparing eye-tracking glasses of claim 1, wherein a height of the matching material stacked on the first surface is less than 30 µm.

10. The method of preparing eye-tracking glasses of claim 1, wherein the matching material or the sealing layer comprises optically clear adhesive or optical clear resin.

11. The method of preparing eye-tracking glasses of claim 1, wherein a refractive index of the matching material or the sealing layer is greater than or equal to 1.

12. The method of preparing eye-tracking glasses of claim 1, wherein a refractive index of the matching material or the sealing layer is in the range of 1.48 to 1.53.

13. The method of preparing eye-tracking glasses of claim 1, wherein each of the electronic components comprises at least one of a vertical cavity surface emitting laser and an infrared light emitting diode.

14. The method of preparing eye-tracking glasses of claim 1, wherein the lens is a concave lens.

15. The method of preparing eye-tracking glasses of claim 1, wherein the sealing layer is a die attach film.

16. The method of preparing eye-tracking glasses of claim 1, wherein the electronic components are arranged on the first surface, the electronic components are raised compared to the first surface.

17. The method of preparing eye-tracking glasses of claim 16, wherein a shape of the electronic components is cubic, granular, columnar or other shapes.

18. The method of preparing eye-tracking glasses of claim 16, wherein a thickness of the electronic components is 60 µm to 180 µm.

19. The method of preparing eye-tracking glasses of claim 1, wherein a material of the functional film comprises polyimide.

\* \* \* \* \*